United States Patent
Kitagawa

(10) Patent No.: US 10,691,565 B2
(45) Date of Patent: Jun. 23, 2020

(54) STORAGE CONTROL DEVICE AND STORAGE CONTROL METHOD

(71) Applicant: FUJITSU LIMITED, Kawasaki-shi, Kanagawa (JP)

(72) Inventor: Kyohei Kitagawa, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 95 days.

(21) Appl. No.: 15/654,908

(22) Filed: Jul. 20, 2017

(65) Prior Publication Data
US 2018/0039553 A1   Feb. 8, 2018

(30) Foreign Application Priority Data

Aug. 3, 2016  (JP) .................................. 2016-152934

(51) Int. Cl.
  *G06F 11/20*  (2006.01)
  *G06F 11/00*  (2006.01)
  *G06F 11/16*  (2006.01)

(52) U.S. Cl.
  CPC .......... *G06F 11/2089* (2013.01); *G06F 11/00* (2013.01); *G06F 11/1666* (2013.01)

(58) Field of Classification Search
  CPC ...... G06F 11/20; G06F 11/2089; G06F 11/00; G06F 11/16; G06F 11/1666
  USPC ........................................................ 714/6.2
  See application file for complete search history.

(56) References Cited

U.S. PATENT DOCUMENTS

| | | | | | |
|---|---|---|---|---|---|
| 5,918,047 | A * | 6/1999 | Leavitt | ................ | G06F 11/1417 713/2 |
| 2008/0109647 | A1 * | 5/2008 | Gavens | ..................... | G06F 8/65 713/2 |
| 2010/0199125 | A1 * | 8/2010 | Reche | ................... | G06F 11/108 714/6.22 |
| 2010/0281297 | A1 * | 11/2010 | Jibbe | ................... | G06F 11/1417 714/6.12 |
| 2011/0131563 | A1 * | 6/2011 | Ohama | ..................... | G06F 8/65 717/168 |

(Continued)

FOREIGN PATENT DOCUMENTS

| | | |
|---|---|---|
| JP | 2003-316582 | 11/2003 |
| JP | 2011-53984 | 3/2011 |
| JP | 2011-158995 | 8/2011 |

OTHER PUBLICATIONS

Notice of Reasons for Refusal, dated Apr. 7, 2020, in corresponding Japanese Application No. 2016-152934 (10 pp.).

*Primary Examiner* — Kamini B Patel
(74) *Attorney, Agent, or Firm* — Staas & Halsey LLP

(57) ABSTRACT

A storage control device includes a first memory, a second memory, and a processor. The first memory stores therein a first startup program for starting up the storage control device. The second memory stores therein a second startup program for starting up the storage control device. The processor performs a startup process of starting up the storage control device by executing the first startup program stored in the first memory. The processor performs diagnosis for the first memory during the startup process. The processor restores, in a case where an abnormality is detected in a first portion of a first area of the first memory, first data stored in the first portion by overwriting the first data with data of a part of the second startup program stored in the second memory. The first area is a storage area in which the first startup program is stored.

12 Claims, 11 Drawing Sheets

(56) References Cited

U.S. PATENT DOCUMENTS

2016/0055113 A1\* 2/2016 Hodge ................. G06F 21/575
710/308

\* cited by examiner

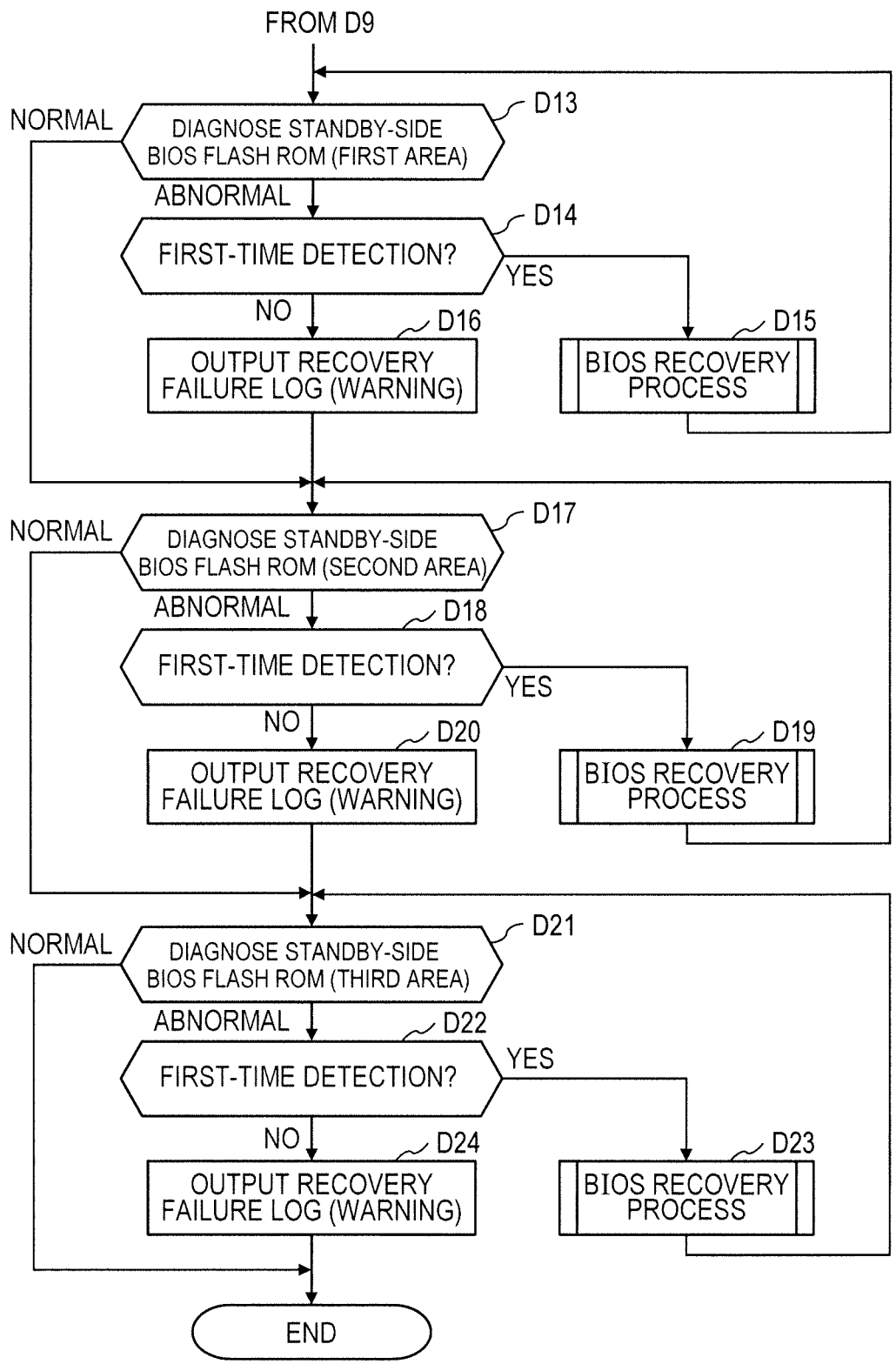

STORAGE CONTROL DEVICE AND STORAGE CONTROL METHOD

CROSS-REFERENCE TO RELATED APPLICATION

This application is based upon and claims the benefit of priority of the prior Japanese Patent Application No. 2016-152934, filed on Aug. 3, 2016, the entire contents of which are incorporated herein by reference.

FIELD

The embodiment discussed herein is related to a storage control device and a storage control method.

BACKGROUND

A storage apparatus such as a redundant array of inexpensive disks (RAID) apparatus or the like is provided with a controller module (CM) for controlling storage devices.

The CM includes a basic input/output system (BIOS) memory storing BIOS which is a startup program, and at the time of startup of the CM, a central processing unit (CPU) of the CM executes the BIOS. Thus, hardware initialization, operating system (OS) reading, basic input/output control with respect to coupled devices and apparatuses, and the like are performed at the time of startup of the CM.

Related techniques are disclosed in, for example, Japanese Laid-open Patent Publication No. 2011-53984, Japanese Laid-open Patent Publication No. 2003-316582, and Japanese Laid-open Patent Publication No. 2011-158995.

SUMMARY

According to an aspect of the present invention, provided is a storage control device including a first memory, a second memory different from the first memory, and a processor coupled to the first memory and the second memory. The first memory is configured to store therein a first startup program for starting up the storage control device. The second memory is configured to store therein a second startup program for starting up the storage control device. The processor is configured to perform a startup process of starting up the storage control device by executing the first startup program stored in the first memory. The processor is configured to perform diagnosis for the first memory during the startup process. The processor is configured to restore, in a case where an abnormality is detected in a first portion of a first area of the first memory, first data stored in the first portion by overwriting the first data with data of a part of the second startup program stored in the second memory. The first area is a storage area in which the first startup program is stored.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

In such a CM in the related art, in a case where an abnormality occurs in the BIOS memory, there is a problem that recovery of the BIOS is difficult.

For example, in a case where a maintenance worker performs maintenance work to recover BIOS data by rewriting the data, there is a possibility of a human error, and further maintenance cost increases.

Further, for example, in the case of restoring the BIOS memory using components other than the BIOS such as kernel and firmware, or external devices such as a universal serial bus (USB) device, it is difficult to identify where an abnormality exists in the BIOS memory.

BRIEF DESCRIPTION OF DRAWINGS

FIG. 11 is a flowchart illustrating a flow of a process for managing the BIOS memory in the CM according to the embodiment.

DESCRIPTION OF EMBODIMENT

An embodiment of a storage control device will be described below with reference to the drawings. The following embodiment is merely an example, and there is no intention to exclude application of various modifications and techniques not explicitly described in the embodiment. That is, the present embodiment may be implemented by various modifications (combining the embodiment and each modification example) without departing from the gist thereof. In addition, each diagram is not intended to include only the constituent elements illustrated in the diagrams, but may include other functions and the like.

For example, a storage apparatus virtualizes storage devices to form a virtual storage environment, and provides a virtual volume to a host device or the like which is a higher level device.

The storage apparatus includes one controller module (CM: a control device, a storage control device) or more. The controller module controls operations in the storage apparatus.

Figure 1:
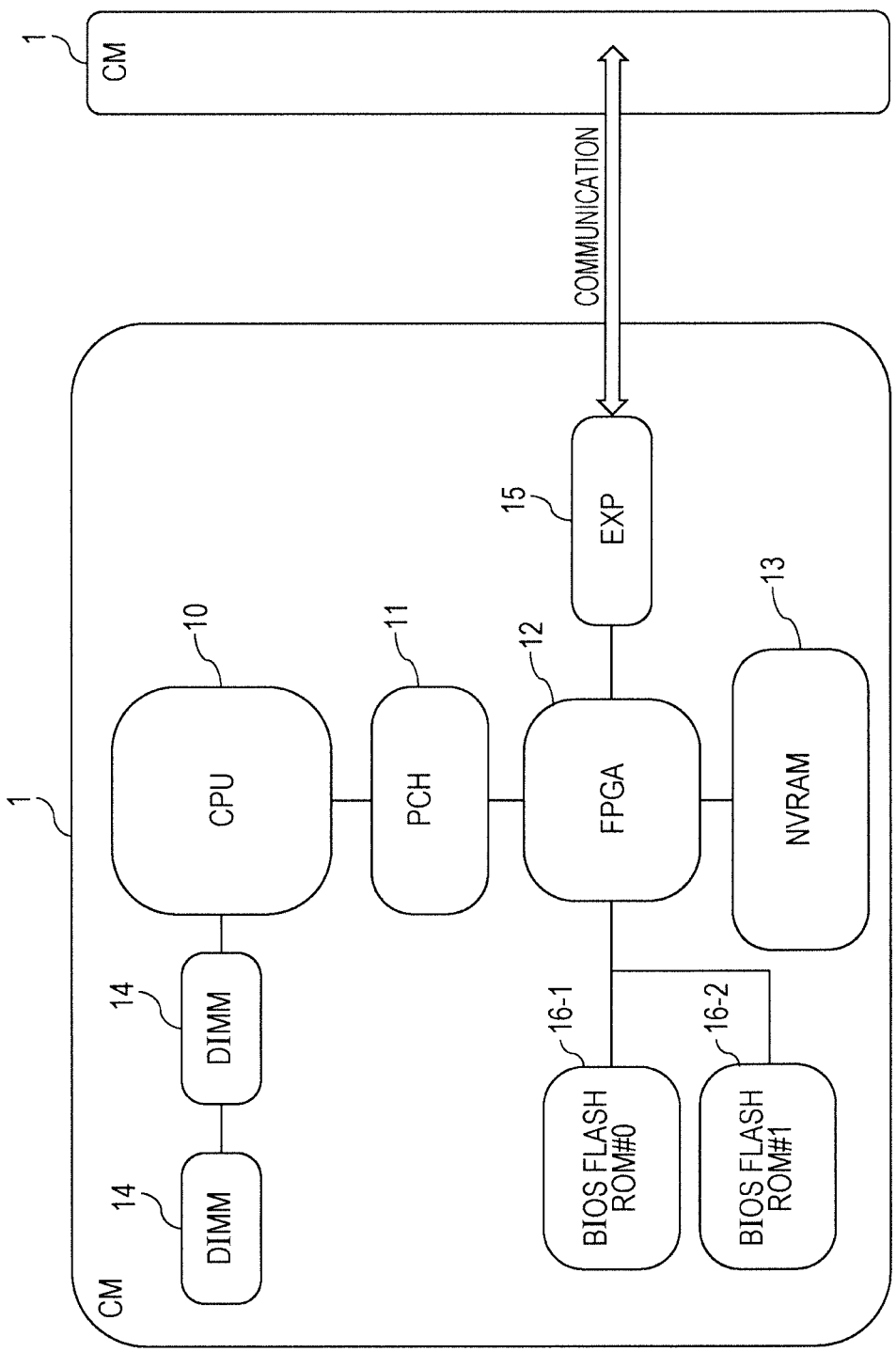
FIG. 1 is a diagram illustrating an exemplary hardware configuration of a CM according to an embodiment.
Figure 2:
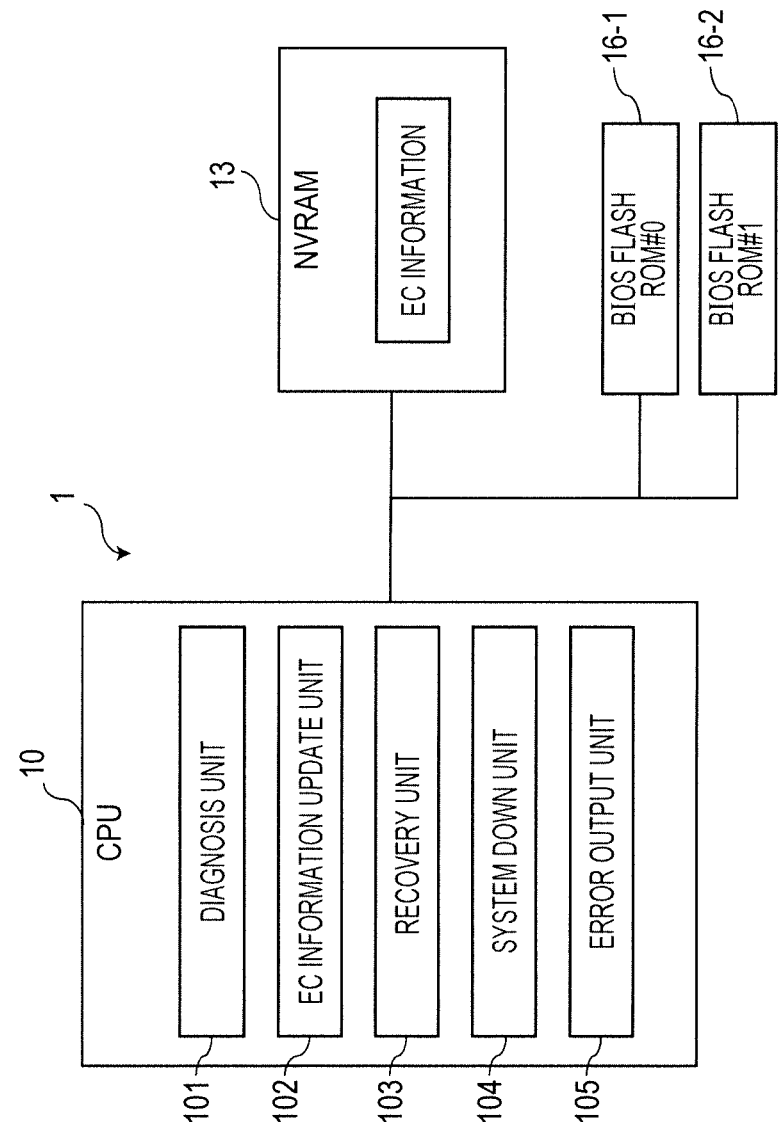
FIG. 2 is a diagram illustrating an exemplary functional configuration of the CM according to the embodiment.

FIG. 1 is a diagram illustrating an exemplary hardware configuration of a CM 1 according to the embodiment, and FIG. 2 is a diagram illustrating an exemplary functional configuration of the CM 1.

The CM 1 is a storage control device (information processing device) that performs various controls such as data access control to the storage devices in accordance with input/output (I/O) requests transmitted from a host device (not illustrated).

As illustrated in FIG. 1, the CM 1 includes a CPU 10, a platform controller hub (PCH) 11, a field programmable gate array (FPGA) 12, a non-volatile random access memory (NVRAM) 13, dual inline memory modules (DIMMs) 14, an expander (EXP) 15 and BIOS flash read-only memories (ROM) 16-1 and 16-2.

The DIMM 14 is a memory module in which a plurality of dynamic random access memory (DRAM) chips are mounted on a printed circuit board. The DIMM 14 is used as a main memory (primary memory or working memory) in which programs to be executed by the CPU 10 (described later) and data are temporarily loaded or stored.

In the example illustrated in FIG. 1, the CM 1 include two DIMMs 14, but the CM 1 is not limited thereto, and one DIMM 14 or three or more DIMMs 14 may be included.

Hereinafter, the DIMM 14 may be referred to as a memory 14.

The PCH 11 is a peripheral input/output control processor and functions as a controller hub coupling the memory 14, the NVRAM 13, the BIOS flash ROMs 16-1 and 16-2, and the like to the CPU 10.

The PCH 11 communicably couples the CPU 10, the DIMMs 14, the FPGA 12, the NVRAM 13, the expander 15, and the BIOS flash ROMs 16-1 and 16-2 with each other.

The PCH 11 is coupled to the NVRAM 13, the expander 15, and the BIOS flash ROMs 16-1 and 16-2 via the FPGA 12.

The FPGA 12 is a programmable large-scale integration (LSI) circuit that may be programmed. In this system, the FPGA 12 is mounted between the expander 15 and the BIOS flash ROMs 16-1 and 16-2 as illustrated in FIG. 1. Upon receipt of a startup instruction from the expander 15, the FPGA 12 performs a process of starting the BIOS flash ROM 16-1 or the BIOS flash ROM 16-2. The FPGA 12 may be omitted.

The BIOS flash ROMs 16-1 and 16-2 are memories (BIOS memories, storage devices) that store the BIOS (startup program), respectively. The BIOS is executed at the time of startup of the CM 1, and realizes hardware initialization, OS reading, basic input/output control with respect to coupled devices and apparatuses, and the like.

A first BIOS (a first program) is stored in the BIOS flash ROM 16-1 (a first storage device), a second BIOS (a second program) is stored in the BIOS flash ROM 16-2 (a second storage device).

The CM 1 improves availability of the system by providing two BIOS flash ROMs 16-1 and 16-2 for redundancy.

It is desirable that the BIOS stored in the BIOS flash ROM 16-1 and the BIOS stored in the BIOS flash ROM 16-2 are the same. The same BIOS indicates that the version thereof is the same, for example.

In the present embodiment, it is assumed that the same BIOS is stored in the BIOS flash ROM 16-1 and the BIOS flash ROM 16-2, and the BIOS flash ROM 16-1 and the BIOS flash ROM 16-2 have the same data structure.

That is, the same data (BIOS data) is stored in the range (address range) indicated by the same address between the BIOS flash ROM 16-1 and the BIOS flash ROM 16-2.

At power-on of the CM 1, the CPU 10 (described later) reads the BIOS from one of the BIOS flash ROMs 16-1 and 16-2 and executes a startup process of the CM 1.

Therefore, the CPU 10 functions as a startup unit that performs a startup process of the CM 1 by using either the BIOS stored in the BIOS flash ROM 16-1 or the BIOS stored in the BIOS flash ROM 16-2.

Hereinafter, the BIOS flash ROM 16-1 may be referred to as a "BIOS flash ROM #0", and the BIOS flash ROM 16-2 may be referred to as a "BIOS flash ROM #1".

Further, in the following description, a BIOS flash ROM will be indicated by the BIOS flash ROM 16-1 (16-2) or the BIOS flash ROM #0 (#1) when it is desirable to specify one of a plurality of BIOS flash ROMs, and indicated by the BIOS flash ROM 16 when referring to any BIOS flash ROM.

The NVRAM 13 is non-volatile memory and stores therein various data. For example, NVRAM 13 stores therein engineering change (EC) information.

The EC information is information that specifies the BIOS flash ROM 16 to be used in the next startup of the CM 1.

Hereinafter, the BIOS flash ROM 16 used for starting the CM 1 may be referred to as a startup-side BIOS flash ROM 16.

On the other hand, the BIOS flash ROM 16 provided for redundancy in a case where any abnormality is detected in the startup-side BIOS flash ROM 16, and not used for starting the CM 1, may be referred to as a standby-side BIOS flash ROM 16.

The EC information specifies the startup-side BIOS flash ROM 16.

The expander 15 communicates with the expander 15 of another CM 1 provided in the storage system. The expander 15 performs startup control and a monitoring process in the CM 1.

The expander 15 refers to the EC information stored in the NVRAM 13 at power-on of the CM 1 (at the time of startup), thereby determining from which (the BIOS flash ROM 16-1 or the BIOS flash ROM 16-2) the BIOS is to be read. The expander 15 notifies the CPU 10 of the determined BIOS flash ROM 16 among the two BIOS flash ROMs 16-1 and 16-2, and issues a BIOS startup instruction.

The CPU 10 is a hardware processor that controls the entire CM 1. The CPU 10 may be a multiprocessor. Instead of the CPU 10, any one of a micro processing unit (MPU), a digital signal processor (DSP), an application specific integrated circuit (ASIC), a programmable logic device (PLD), and FPGA may be used. Further, the CPU 10 may be a combination of two or more element types of the CPU, the MPU, the DSP, the ASIC, the PLD, and the FPGA.

The CPU 10 is a processing device that performs various controls and calculations, and realizes various functions by executing an OS and a program stored in a storage device such as the NVRAM 13 or the like. For example, the CPU 10 realizes the startup process of the CM 1 by executing the BIOS stored in the BIOS flash ROM 16.

As illustrated in FIG. 2, the CPU 10 realizes functions as a diagnosis unit 101, an EC information update unit 102, a recovery unit 103, a system down unit 104, and an error output unit 105.

The diagnosis unit 101 performs diagnosis for the BIOS flash ROM 16. That is, the diagnosis unit 101 realizes a self-diagnosis function of the BIOS flash ROM 16 in the CM 1.

In the CM 1, by performing diagnosis for the data stored in the BIOS flash ROM 16, an unexpected operation due to a BIOS flash ROM abnormality from device faults or data corruption is avoided.

Hereinafter, performing diagnosis for the data (BIOS data) stored in the BIOS flash ROM 16 may simply be referred to as diagnosis for the BIOS flash ROM 16.

The diagnosis unit 101 performs diagnosis for the two redundant BIOS flash ROMs 16-1 and 16-2.

The BIOS initializes various kinds of hardware in the course of the startup process. The BIOS, for example, also initializes the memory 14, and the memory 14 is unable to be used before initialization of the memory 14 is completed.

Depending on whether or not the memory 14 is available, the processing speed of the BIOS by the CPU 10 varies greatly. Accordingly, depending on the startup phases (extensible firmware interface (EFI) phases), the BIOS changes an operation location (program load area) step by step in three periods as illustrated in the following first to third periods.

First period: immediately after the startup, the BIOS operates on the BIOS flash ROM 16. Security (SEC) phase of the EFI phases corresponds to the first period. In the first period, the memory 14 is not yet available.

Second period: after the first period, when a cache as RAM (CAR), which is a function to make use of a cache of the CPU 10 as a memory, is enabled, the BIOS is loaded into the CAR area to operate. A part of pre-EFI initialization (PEI) phase of the EFI phases corresponds to the second period.

Third period: after the second period, when the memory 14 becomes available, the BIOS operates with the program loaded on the memory 14. A part of the PEI phase, driver execution environment (DXE) phase, and boot device selection (BDS) phase of the EFI phases correspond to the third period.

The diagnosis unit 101 performs diagnosis for the BIOS flash ROM 16 in a step-wise manner (three phases) in the order of (a1) flash operation area, (a2) CAR operation area, and (a3) memory operation area depending on the operation location of the BIOS described above.

The (a1) flash operation area is an area in which data (BIOS data, BIOS program, and modules) to be read in the EFI phase is stored in the BIOS flash ROM 16. Hereinafter, the flash operation area may be referred to as a first area.

In the BIOS flash ROM 16, the area in which the BIOS data to be executed by the CPU 10 in the above-described first period is stored corresponds to the first area.

The (a2) CAR operation area is an area in which data (BIOS program, modules) to be read is stored until the memory 14 becomes available after the CAR is enabled. Hereinafter, the CAR operation area may be referred to as a second area.

In the BIOS flash ROM 16, the area in which the BIOS data to be executed by the CPU 10 in the above-described second period is stored corresponds to the second area.

The (a3) memory operation area is an area, in the BIOS flash ROM 16, in which data (BIOS program, modules) to be read after the memory 14 becomes available is stored. Hereinafter, the memory operation area may be referred to as a third area.

In the BIOS flash ROM 16, the area in which the BIOS data to be executed by the CPU 10 in the above-described third period is stored corresponds to the third area.

As described above, during the first period, the memory 14 is not yet available. Hereinafter, the first area may be referred to as a memory unavailable area. In contrast, in the second and third periods, the CAR is enabled or the memory 14 is in an available state. Hereinafter, the second and third areas may be referred to as memory available areas.

The diagnosis unit 101 performs diagnosis for the BIOS flash ROM 16 in the order of the first area, the second area, and the third area.

The diagnosis unit 101 uses a checksum to perform diagnosis for the BIOS flash ROM 16.

The diagnosis unit 101 may identify where an abnormality occurs in the BIOS flash ROM 16 in block or sector units.

However, in the BIOS flash ROM 16, the area to be diagnosed when the memory is unavailable has no checksum due to an EFI rule. Therefore, when the BIOS data to be written in the BIOS flash ROM 16 is created, a checksum is calculated and stored in the BIOS data. In this way, the entire area of the BIOS flash ROM 16 may be diagnosed by the diagnosis unit 101.

The diagnosis unit 101 performs diagnosis for the standby-side BIOS flash ROM 16 after diagnosis for the startup-side BIOS flash ROM 16 is completed.

The EC information update unit 102 updates (changes) the EC information stored in the NVRAM 13. For example, when a system down process is performed by the system down unit 104, the EC information update unit 102 rewrites the EC information such that the other BIOS flash ROM 16 is to be used at the time of the next startup.

In the course of the system down process performed by the system down unit 104, the EC information update unit 102 sets (switches) the EC information set in the NVRAM 13 such that the current standby-side BIOS flash ROM 16 is set as the next startup-side BIOS flash ROM 16.

That is, the EC information update unit 102 functions as a setting unit that sets the BIOS to be used by the CPU 10 (startup unit) among the BIOS programs stored in the BIOS flash ROM 16-1 and the BIOS stored in the BIOS flash ROM 16-2.

The recovery unit 103 restores (recovers) the data of the BIOS flash ROM 16 (hereinafter, referred to as an abnormal BIOS flash ROM 16 or a BIOS flash ROM 16 to be restored) in which an abnormality is detected by the diagnosis unit 101.

That is, the recovery unit 103 realizes a self-restoration function of the BIOS flash ROM 16 in the CM 1.

Specifically, the recovery unit 103 identifies an address (abnormality-occurred address) of a point (abnormality-occurred point) where an abnormality is detected by the diagnosis unit 101 in the abnormal BIOS flash ROM 16.

The abnormality-occurred point in the abnormal BIOS flash ROM 16 may be identified by a known method, for example, by referring to the diagnosis result of the diagnosis unit 101, and description thereof will be omitted.

The recovery unit 103 determines a predetermined address range including the abnormality-occurred address as a restoration target range.

The recovery unit 103 extracts the BIOS data from the portion corresponding to the restoration range of the abnormal BIOS flash ROM 16, in the other BIOS flash ROM 16 where no abnormality is detected.

As described above, in the present embodiment, the BIOS flash ROM 16-1 and the BIOS flash ROM 16-2 are provided with the same data structure, and the same BIOS data is stored at the same address position.

Therefore, the recovery unit 103 extracts data (BIOS data) in the same address range as the restoration target range determined as described above as restoration data from the other BIOS flash ROM 16 where no abnormality is detected.

Then, the recovery unit 103 overwrites the data of the restoration target range including the abnormality-occurred point in the abnormal BIOS flash ROM 16 with the data (restoration data) extracted from the other BIOS flash ROM 16.

In other words, in a plurality of redundant BIOS flash ROMs 16, the recovery unit 103 overwrites and updates the data of the restoration target range including the abnormality-occurred point in one BIOS flash ROM 16 with the data (restoration data) read from the same address range of the other BIOS flash ROM 16 where no abnormality is detected.

As a result, the data of the BIOS flash ROM 16 to be restored may be restored to a state where there is no abnormality.

Hereinafter, restoration of the data (BIOS data) stored in the BIOS flash ROM 16 may simply be referred to as restoration of the BIOS flash ROM 16.

Since the diagnosis for the first area of the startup-side BIOS flash ROM 16 is performed in a state where the memory 14 is unavailable, the program (running startup program) which is performing the diagnosis process is also included the diagnosis target.

Therefore, in a case where an abnormality is detected in the first area of the startup-side BIOS flash ROM 16, the processing result of the running startup program has also low reliability. Thus, in a case where the diagnosis unit 101 detects an abnormality (diagnosis abnormality) in the BIOS flash ROM 16 in the state where the CAR is not yet enabled and the memory 14 is unavailable as described above, the recovery process for the first area, in which the abnormality is detected, is not performed, the EC information update unit 102 is caused to switch the EC information, and recovery is performed at the time of the next startup of the CM 1.

The system down unit 104 performs a process (system down process) of stopping (restarting) the CM 1.

In the system down process, the system down unit 104 causes the EC information update unit 102 to rewrite (EC information update) the EC information such that the other BIOS flash ROM 16 is to be used at the time of the next startup.

The system down unit 104 writes information (hereinafter, simply referred to as a reset request) indicating a reset request in a predetermined storage area of the NVRAM 13. The system down unit 104 also performs a process of stopping power supply to the CM 1.

In a case where an abnormality is detected in the BIOS flash ROM 16 and the abnormality is not resolved even if the recovery unit 103 performs restoration, the error output unit 105 outputs information (error log) indicating that the recovery of the BIOS flash ROM 16 has failed. Even in a case where an abnormality is detected in the diagnosis for the first to third areas of the standby-side BIOS flash ROM 16 by the diagnosis unit 101, the error output unit 105 outputs information (warning log) indicating that an abnormality has been detected in the standby-side BIOS flash ROM 16.

The error output unit 105 outputs an error log and a warning log to, for example, a predetermined storage area or the like of the NVRAM 13.

The CPU 10 functions as the diagnosis unit 101, the EC information update unit 102, the recovery unit 103, the system down unit 104, and the error output unit 105 by executing a memory management program (storage device management program). The memory management program is stored in the first area of each BIOS flash ROM 16 as a module of the BIOS.

The memory management program is a program for managing the BIOS flash ROM 16 provided in the CM 1 and realizes diagnosis (self-diagnosis) and restoration (self-restoration) of the BIOS flash ROM 16.

A program (memory management program) for realizing functions as the diagnosis unit 101, the EC information update unit 102, the recovery unit 103, the system down unit 104, and the error output unit 105, is provided in a form of being recorded in a computer-readable recording medium such as a flexible disk, a compact disc (CD) such as CD-ROM, CD-R, CD-RW, and the like, a digital versatile disc (DVD) such as DVD-ROM, DVD-RAM, DVD-R, DVD+R, DVD-RW, DVD+RW, HD DVD, and the like, a Blu-ray disc, a magnetic disk, an optical disk, a magneto-optical disk, or the like. Then, the computer reads the program from the recording medium, transfers the program to an internal storage device or an external storage device, and stores the program to use. The program may be stored in a storage device (recording medium) such as a magnetic disk, an optical disk, a magneto-optical disk, or the like, and provided to the computer from the storage device via a communication path.

The recording medium for recording the memory management program (storage device management program) includes the BIOS flash ROM 16.

When realizing the functions as the diagnosis unit 101, the EC information update unit 102, the recovery unit 103, the system down unit 104, and the error output unit 105, the program stored in the internal storage device (each BIOS flash ROM 16 in the embodiment) is executed by a microprocessor (in the present embodiment, the CPU 10) of the computer. At this time, the computer may read and execute the program recorded on the recording medium.

Figure 3:
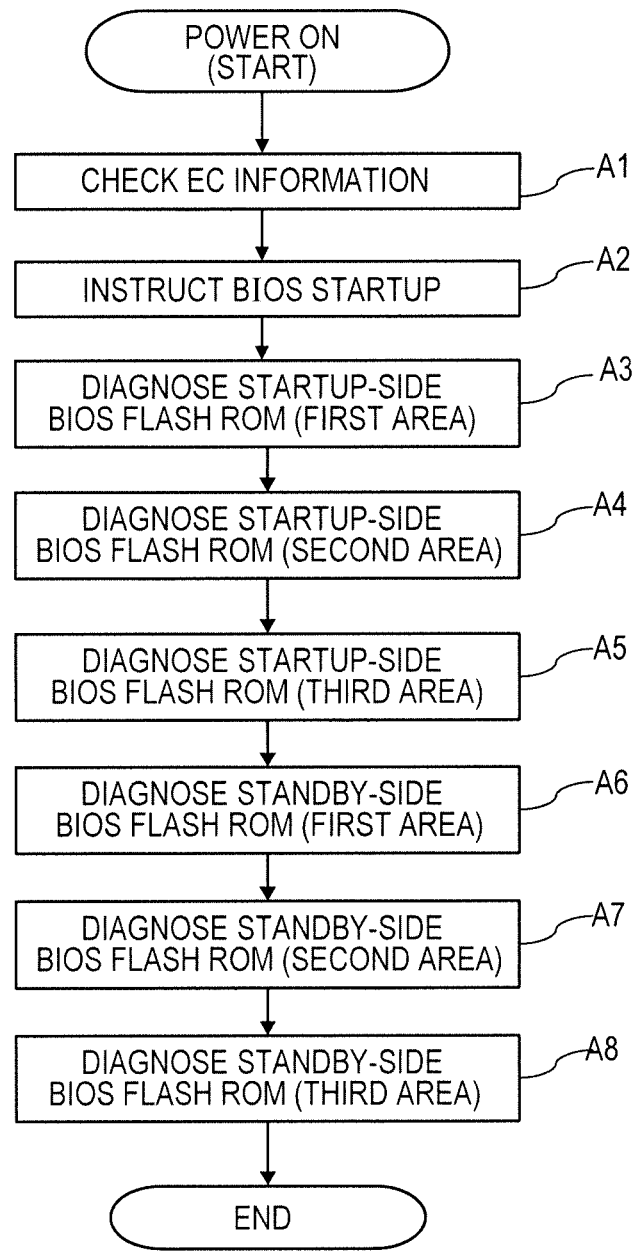
FIG. 3 is a flowchart illustrating a flow of a process for managing a BIOS memory at power-on of the CM according to the embodiment.

The process for managing the BIOS memory at power-on of the CM 1 according to the embodiment configured as described above will be described with reference to the flowchart illustrated in FIG. 3.

The expander 15 checks the EC information stored in the NVRAM 13 to determine which one of the BIOS flash ROMs 16 is to be used to start the CM 1 (A1).

Here, it is assumed that the BIOS flash ROM #0 is set as the startup-side BIOS flash ROM 16 in the EC information.

The expander 15 issues an instruction (BIOS startup instruction) to the CPU 10 to execute the BIOS with the BIOS flash ROM #0 as the startup-side BIOS flash ROM 16 (A2).

The CPU 10 reads and executes the BIOS from the first area of the BIOS flash ROM #0. The memory management program is included in the BIOS. The CPU 10 realizes functions as the diagnosis unit 101, the EC information update unit 102, the recovery unit 103, the system down unit 104, and the error output unit 105 by executing the memory management program.

The diagnosis unit 101 first performs diagnosis for the startup-side BIOS flash ROM 16-1 (BIOS flash ROM #0). The diagnosis unit 101 performs diagnosis for the startup-side BIOS flash ROM #0 in the order of the first area, the second area, and the third area (A3 to A5).

The diagnosis unit 101 then performs diagnosis for the standby-side BIOS flash ROM 16-2 (BIOS flash ROM #1). The diagnosis unit 101 performs diagnosis for the standby-side BIOS flash ROM #1 in the order of the first area, the second area, and the third area (A6 to A8).

After diagnosis for the BIOS flash ROM 16 at the time of startup of the CM 1 is completed, other processes in the BIOS are performed, and startup of the OS or the like is performed.

Figure 4:
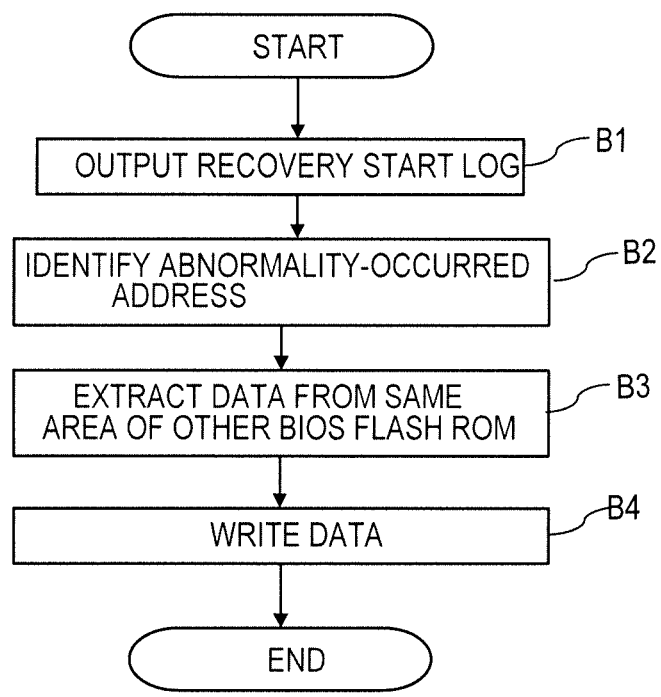
FIG. 4 is a flowchart illustrating a flow of a recovery process for a BIOS flash ROM in the CM according to the embodiment.

Next, the recovery process for the BIOS flash ROM 16 in the CM 1 according to the embodiment will be described with reference to the flowchart illustrated in FIG. 4.

For example, as will be described later, the recovery process is performed in a case where an abnormality is detected for the first time in any of the second and third areas of the startup-side BIOS flash ROM 16 and the first to third areas of the standby-side BIOS flash ROM 16 by the diagnosis unit 101.

The recovery unit 103 outputs a log indicating recovery start to a predetermined storage area of the NVRAM 13 (B1).

Based on the diagnosis result of the diagnosis unit 101, the recovery unit 103 identifies an address (the abnormality-occurred address) of a point (the abnormality-occurred point) in which an abnormality is detected in the BIOS flash ROM 16 to be restored (B2). Then, the recovery unit 103 determines a predetermined address range including the abnormality-occurred address as a restoration target range.

The recovery unit 103 extracts data (restoration data) stored in an area of a predetermined size (restoration target range), which includes the abnormality-occurred address in the BIOS flash ROM 16, from the BIOS flash ROM 16 in which no abnormality is detected among the two redundant BIOS flash ROMs 16 (B3).

Then, the recovery unit 103 overwrites data stored in the same address area (restoration target area) in the BIOS flash ROM 16 to be restored with the restoration data extracted from the other BIOS flash ROM 16 (B4). As a result, the recovery of the BIOS flash ROM 16 to be restored is completed, and the process is terminated.

Figure 5:
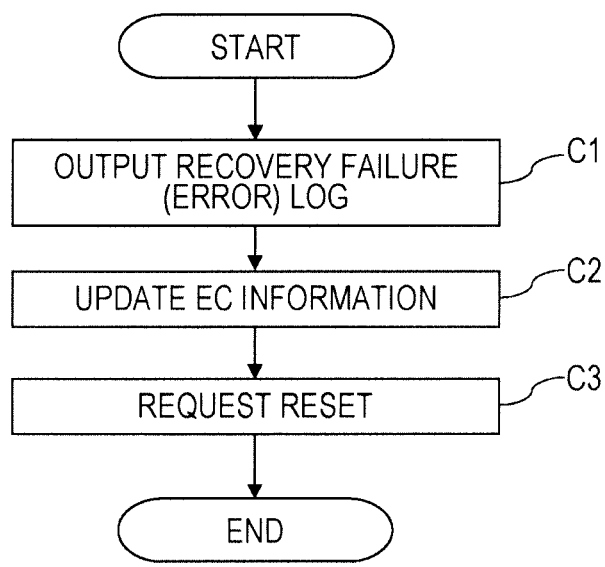
FIG. 5 is a flowchart illustrating a process performed by a system down unit in the CM according to the embodiment.

Next, a system down process in the CM 1 according to the embodiment will be described with reference to the flowchart illustrated in FIG. 5.

As will be described later (refer to D4 in FIG. 9 and D8, D12 in FIG. 10), for example, the system down process is performed in a case where an abnormality is detected for the first time in any of the second and third areas of the startup-side BIOS flash ROM 16 and the first to third areas of the standby-side BIOS flash ROM 16 by the diagnosis unit 101 and the abnormality is not resolved even if the recovery unit 103 performs a restoration process. That is, the system down process is performed in a case where, even if the restoration process performed by the recovery unit 103 is performed on the abnormal BIOS flash ROM 16, an abnormality is detected again in the BIOS flash ROM 16 to be restored.

The system down unit 104 causes the error output unit 105 to output a log (error log), which indicates that the recovery by the recovery unit 103 has failed, to a predetermined storage area of the NVRAM 13 (C1).

The system down unit 104 causes the EC information update unit 102 to update the EC information stored in the NVRAM 13. That is, the system down unit 104 causes the EC information update unit 102 to register information specifying the BIOS flash ROM 16 which is different from the abnormal BIOS flash ROM 16 to the NVRAM 13 as EC information (C2).

Thereafter, the system down unit 104 writes information (hereinafter, simply referred to as a reset request) indicating a reset request in a predetermined storage area of the NVRAM 13 (C3). The system down unit 104 also performs a process of stopping power supply to the CM 1. Then, the system down process in the CM 1 is terminated.

Next, details of the process for managing the BIOS memory in the CM 1 according to the embodiment will be described with reference to FIGS. 6 to 8 and the flowcharts illustrated in FIGS. 9 to 11.

Figure 6:
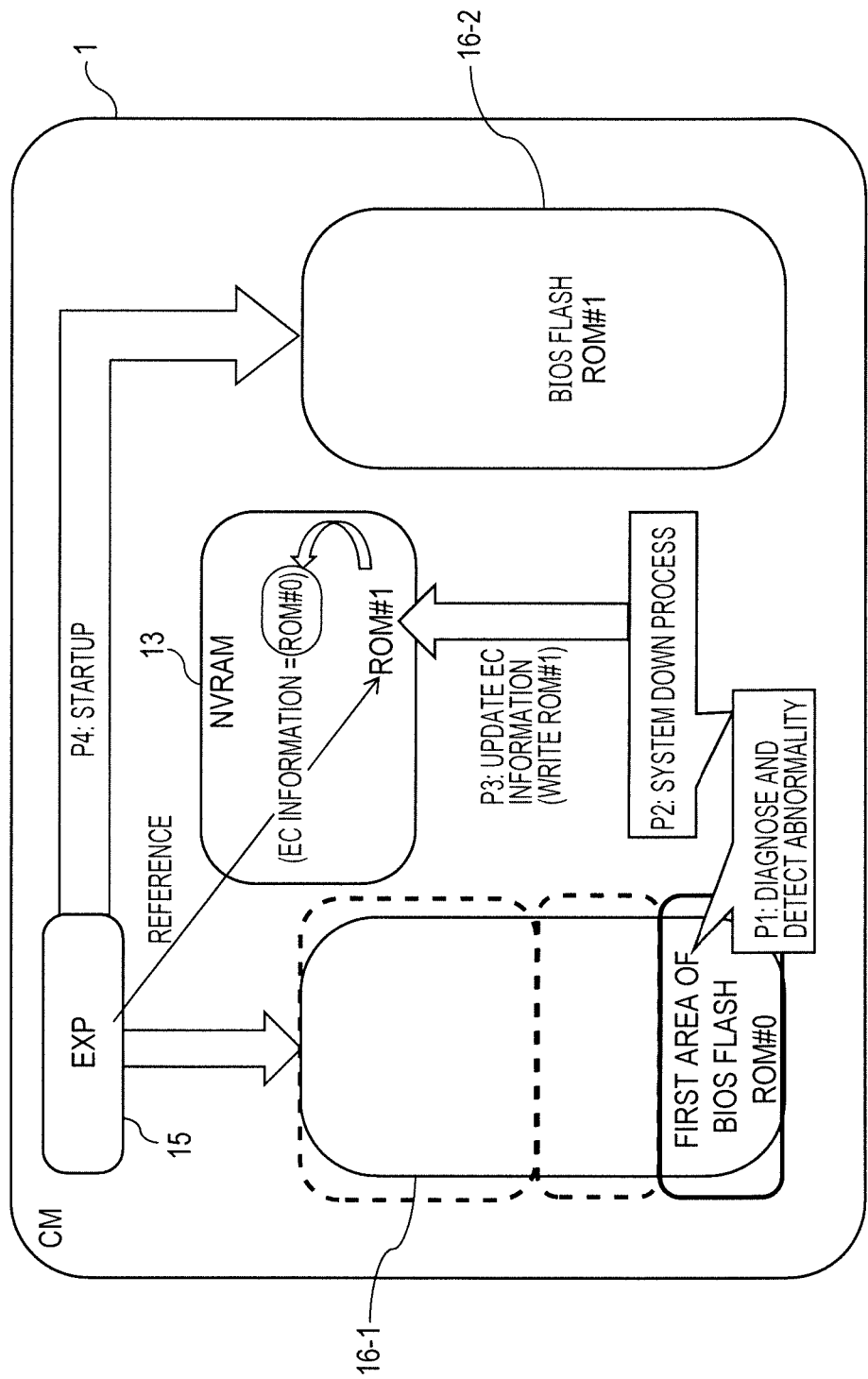
FIG. 6 is a diagram illustrating a process in a case where an abnormality is detected in a first area of a startup-side BIOS flash ROM in the CM according to the embodiment.

FIG. 6 is a diagram illustrating a process in a case where an abnormality is detected in the first area of the startup-side BIOS flash ROM 16. FIG. 7 is a diagram illustrating a process in a case where an abnormality is detected in the second area of the startup-side BIOS flash ROM 16. FIG. 8 is a diagram illustrating a process in a case where an abnormality is detected in the second area of the standby-side BIOS flash ROM 16.

Figure 9:
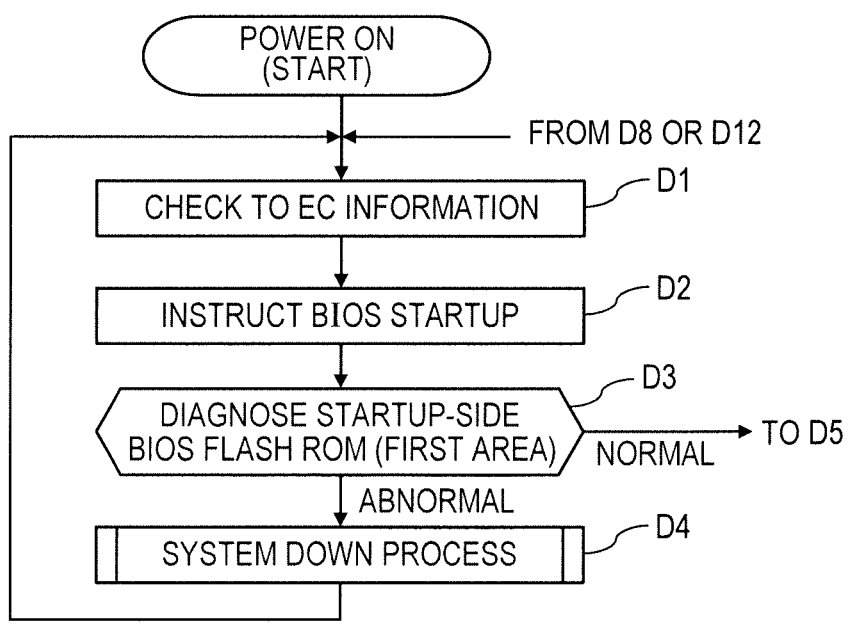
FIG. 9 is a flowchart illustrating a flow of a process for managing the BIOS memory in the CM according to the embodiment.

The expander 15 checks the EC information stored in the NVRAM 13 to determine which one of the BIOS flash ROMs 16 is to be used to start the CM 1 (D1 in FIG. 9).

Here, it is assumed that the BIOS flash ROM 16-1 (BIOS flash ROM #0) is set as the startup-side BIOS flash ROM 16 in the EC information.

The expander 15 issues an instruction (BIOS startup instruction) to the CPU 10 to perform a startup process of the CM 1 using the BIOS stored in the BIOS flash ROM #0 serving as the startup-side BIOS flash ROM 16 (D2 in FIG. 9).

The CPU 10 reads and executes the BIOS from the first area of the BIOS flash ROM #0. The memory management program is included in the BIOS. The CPU 10 realizes functions as the diagnosis unit 101, the EC information update unit 102, the recovery unit 103, the system down unit 104, and the error output unit 105 by executing the memory management program.

The diagnosis unit 101 performs diagnosis for the first area of the startup-side BIOS flash ROM 16 (D3 in FIG. 9).

As a result of the diagnosis in D3, in a case where an abnormality is detected in the first area of the startup-side BIOS flash ROM 16 ("abnormal" in D3; P1 in FIG. 6), the system down unit 104 performs the system down process (D4 in FIG. 9; P2 in FIG. 6).

In the system down process, an update operation for the EC information is included, in which the EC information update unit 102 changes the setting of the BIOS flash ROM 16 for the next startup, for example, from the BIOS flash ROM #0 to the BIOS flash ROM #1 (P3 in FIG. 6).

As described above, in a case where an abnormality is detected in the first area of the startup-side BIOS flash ROM 16, since a recovery process is not performed at that time, the output of the error log, which indicates that the recovery process performed by the recovery unit 103 has failed (C1 in FIG. 5), is not performed.

Thereafter, the process returns to D1, and in the re-startup process of the CM 1, the expander 15 checks the EC information stored in the NVRAM 13. Since the information indicating the BIOS flash ROM #1 is set in the EC information, the CPU 10 starts the CM 1 using the BIOS stored in the startup-side BIOS flash ROM #1 (P4 in FIG. 6).

Figure 10:
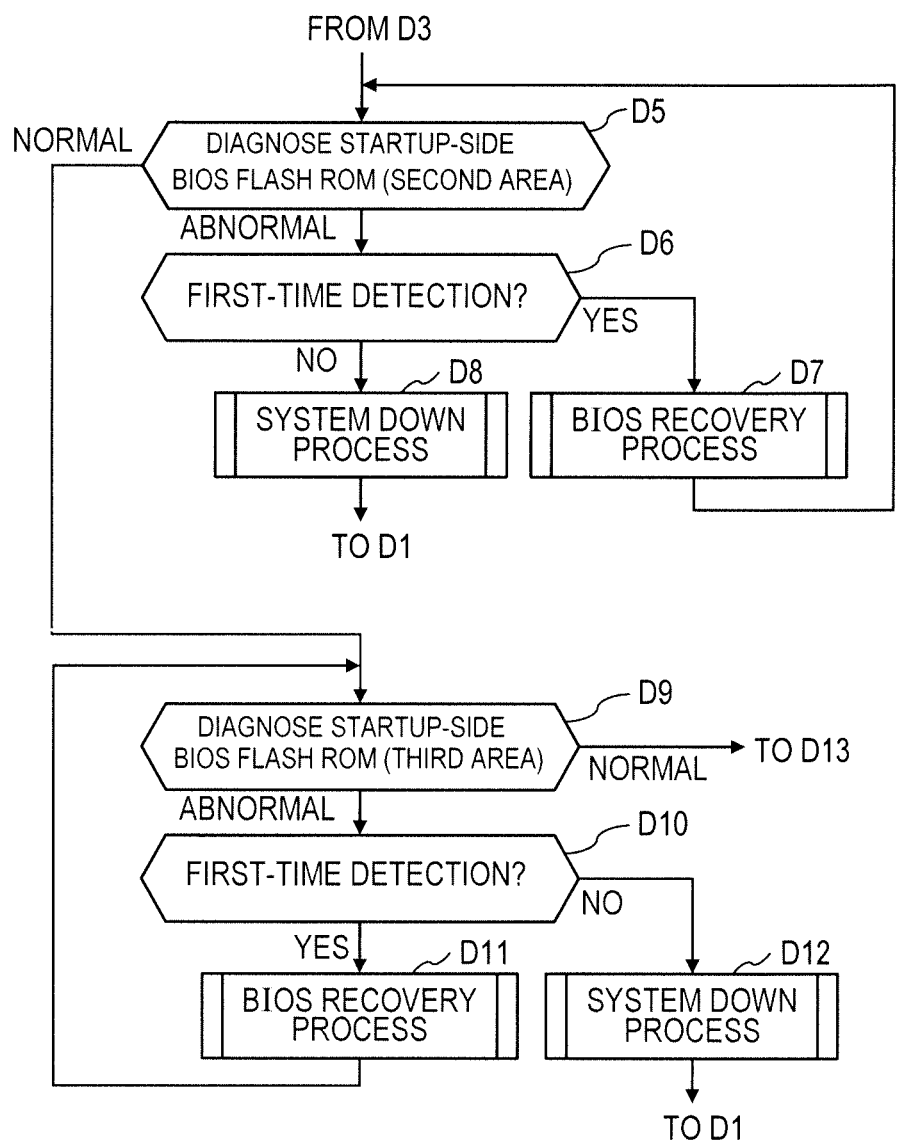
FIG. 10 is a flowchart illustrating a flow of a process for managing the BIOS memory in the CM according to the embodiment.

As a result of the diagnosis in D3, in a case where no abnormality is detected in the first area ("normal" in D3), the process proceeds to D5 in FIG. 10.

The diagnosis unit 101 performs diagnosis for the second area of the startup-side BIOS flash ROM 16 (D5 in FIG. 10).

As a result of the diagnosis in D5, in a case where an abnormality is detected in the second area of the startup-side BIOS flash ROM 16 ("abnormal" in D5; P5 in FIG. 7), the system down unit 104 checks whether or not the detection of an abnormality in the second area is the first-time detection (D6 in FIG. 10).

As a result of the check in D6, in a case where the detection of an abnormality in the second area is the first-time detection (YES in D6), the recovery unit 103 performs the recovery process for the BIOS (D7 in FIG. 10).

Figure 7:
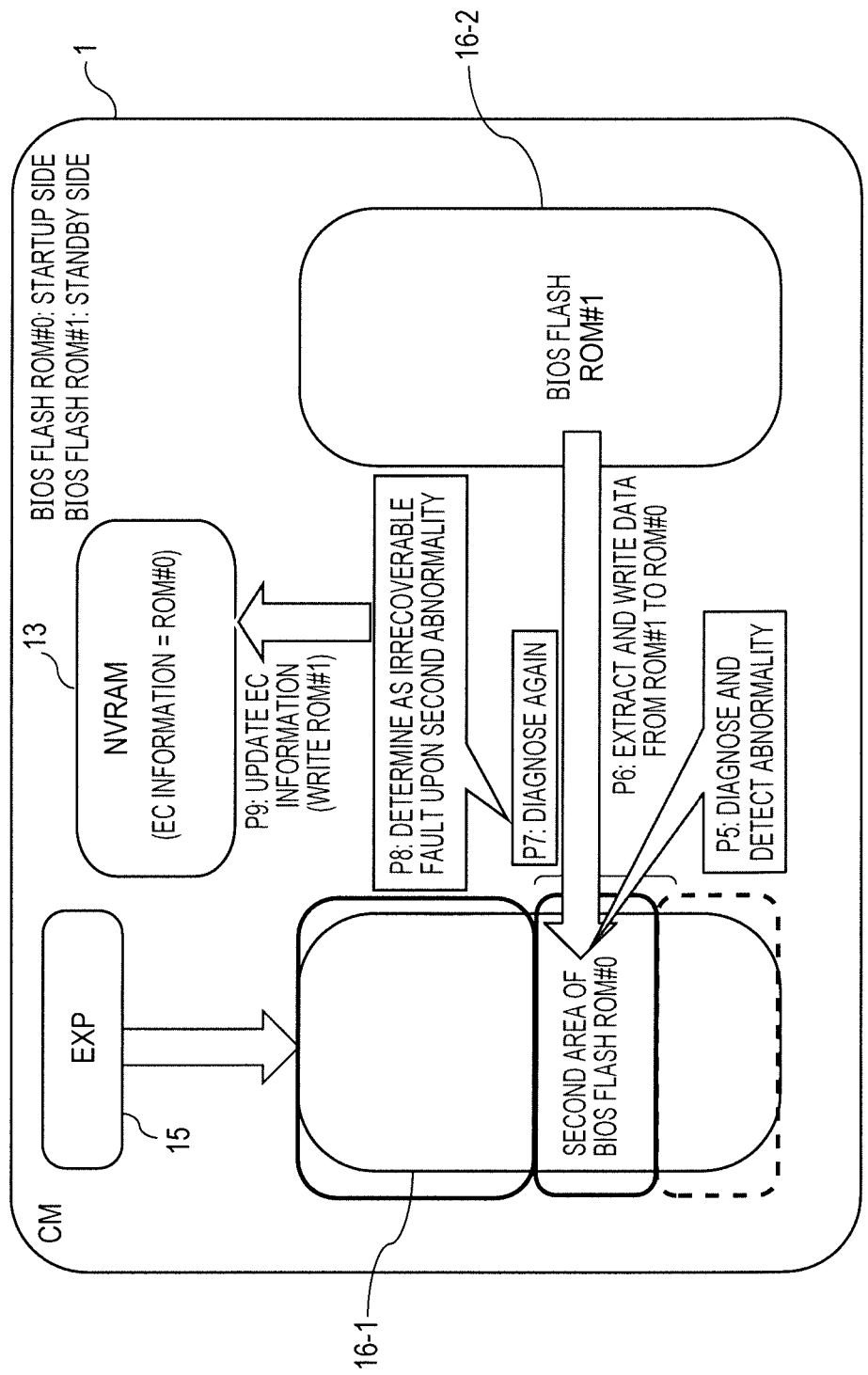
FIG. 7 is a diagram illustrating a process in a case where an abnormality is detected in a second area of a startup-side BIOS flash ROM in the CM according to the embodiment.

That is, the recovery unit 103 rewrites the data of the abnormality-occurred point in the startup-side BIOS flash ROM #0 by using the data read from the standby-side BIOS flash ROM #1 (refer to P6 in FIG. 7).

After the recovery process is completed, the process returns to the D5. In this way, the diagnosis unit 101 diagnoses again the second area of the startup-side BIOS flash ROM #0 where the recovery process has been performed (P7 in FIG. 7).

As a result of the check in D6, in a case where the detection of an abnormality in the second area is not the first-time detection (NO in D6), it is determined that an irrecoverable fault occurs in the second area (P8 in FIG. 7). Then, the system down unit 104 performs the system down process (D8 in FIG. 10).

In the system down process, an update operation for the EC information is included, in which the EC information update unit 102 changes the setting of the BIOS flash ROM 16 for the next startup, for example, from the BIOS flash ROM #0 to the BIOS flash ROM #1 (P9 in FIG. 7). Thereafter, the process returns to D1 in FIG. 9.

As a result of the diagnosis in D5, in a case where no abnormality is detected in the second area ("normal" in D5), the process proceeds to D9 in FIG. 10.

The diagnosis unit 101 performs diagnosis for the third area of the startup-side BIOS flash ROM 16 (D9 in FIG. 10).

As a result of the diagnosis in D9, in a case where an abnormality is detected in the third area of the startup-side BIOS flash ROM 16 ("abnormal" in D9), the system down unit 104 checks whether or not the detection of an abnormality in the third area is the first-time detection (D10 in FIG. 10).

As a result of the check in D10, in a case where the detection of an abnormality in the third area is the first-time detection (YES in D10), the recovery unit 103 performs the recovery process for the BIOS (D11 in FIG. 10).

That is, the recovery unit 103 rewrites the data of the abnormality-occurred point in the startup-side BIOS flash ROM #0 by using the data read from the standby-side BIOS flash ROM #1.

After the recovery process is completed, the process returns to the D9. In this way, the diagnosis unit 101 diagnoses again the third area of the startup-side BIOS flash ROM #0 where the recovery process has been performed.

As a result of the check in D10, in a case where the detection of an abnormality in the third area is not the first-time detection (NO in D10), it is determined that an irrecoverable fault occurs in the third area.

Then, the system down unit 104 performs the system down process (D12 in FIG. 10).

In the system down process, an update operation for the EC information is included, in which the EC information update unit 102 changes the setting of the BIOS flash ROM 16 for the next startup to the current standby-side BIOS flash ROM 16. Thereafter, the process returns to D1 in FIG. 9.

As a result of the diagnosis in D9, in a case where no abnormality is detected in the third area ("normal" in D9), the process proceeds to D13 in FIG. 11.

The diagnosis unit 101 performs diagnosis for the first area of the standby-side BIOS flash ROM 16 (D13 in FIG. 11).

As a result of the diagnosis in D13, in a case where an abnormality is detected in the first area of the standby-side BIOS flash ROM 16 ("abnormal" in D13), the error output unit 105 outputs information (warning log) indicating that an abnormality is detected in the first area of the standby-side BIOS flash ROM 16.

The system down unit 104 checks whether or not the detection of an abnormality in the first area is the first-time detection (D14 in FIG. 11).

As a result of the check in D14, in a case where the detection of an abnormality in the first area is the first-time detection (YES in D14), the recovery unit 103 performs the recovery process for the BIOS (D15 in FIG. 11).

That is, the recovery unit 103 rewrites the data of the abnormality-occurred point in the standby-side BIOS flash ROM #1 by using the data read from the startup-side BIOS flash ROM #0.

After the recovery process is completed, the process returns to the D13. In this way, the diagnosis unit 101 diagnoses again the first area of the standby-side BIOS flash ROM #1 where the recovery process has been performed.

As a result of the check in D14, in a case where the detection of an abnormality in the first area is not the first-time detection (NO in D14), it is determined that an irrecoverable fault occurs in the first area.

Then, the error output unit 105 outputs a recovery failure log (warning), which indicates that the recovery process performed by the recovery unit 103 has failed, to a predetermined storage area of the NVRAM 13 (D16 in FIG. 11). Thereafter, the process proceeds to D17 in FIG. 11.

As a result of the diagnosis in D13, in a case where no abnormality is detected in the first area ("normal" in D13), the process proceeds to D17 in FIG. 11.

In D17, the diagnosis unit 101 performs diagnosis for the second area of the standby-side BIOS flash ROM 16.

Figure 8:
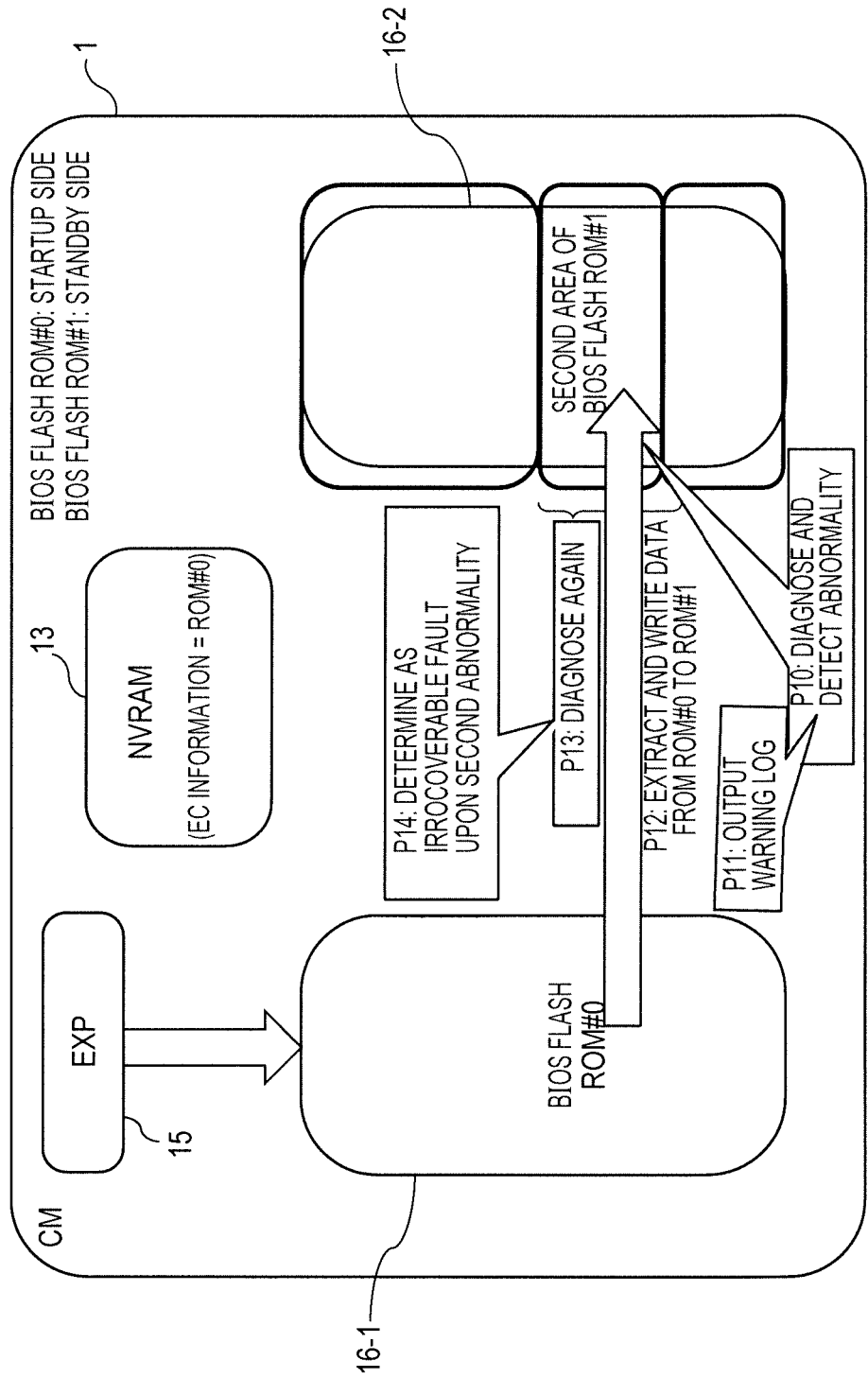
FIG. 8 is a diagram illustrating a process in a case where an abnormality is detected in a second area of a standby-side BIOS flash ROM in the CM according to the embodiment.

As a result of the diagnosis in D17, in a case where an abnormality is detected in the second area of the standby-side BIOS flash ROM 16 ("abnormal" in D17, P10 in FIG. 8), the error output unit 105 outputs information (warning log) indicating that an abnormality is detected in the second area of the standby-side BIOS flash ROM 16 (P11 in FIG. 8).

The system down unit 104 checks whether or not the detection of an abnormality in the second area is the first-time detection (D18 in FIG. 11).

As a result of the check in D18, in a case where the detection of an abnormality in the second area is the first-time detection (YES in D18), the recovery unit 103 performs the recovery process for the BIOS (D19 in FIG. 11).

That is, the recovery unit 103 rewrites the data of the abnormality-occurred point in the standby-side BIOS flash ROM #1 by using the data read from the startup-side BIOS flash ROM #0 (refer to P12 in FIG. 8).

After the recovery process is completed, the process returns to the D17. In this way, the diagnosis unit 101 diagnoses again the second area of the standby-side BIOS flash ROM #1 where the recovery process has been performed (P13 in FIG. 8).

As a result of the check in D18, in a case where the detection of an abnormality in the second area is not the first-time detection (NO in D18), it is determined that an irrecoverable fault occurs in the second area (P14 in FIG. 8).

Then, the error output unit 105 outputs a recovery failure log (warning), which indicates that the recovery process performed by the recovery unit 103 has failed, to a predetermined storage area of the NVRAM 13 (D20 in FIG. 11). Thereafter, the process proceeds to D21 in FIG. 11.

As a result of the diagnosis in D17, in a case where no abnormality is detected in the second area ("normal" in D17), the process proceeds to D21 in FIG. 11.

The diagnosis unit 101 performs diagnosis for the third area of the standby-side BIOS flash ROM 16 (D21 in FIG. 11).

As a result of the diagnosis in D21, in a case where an abnormality is detected in the third area of the standby-side BIOS flash ROM 16 ("abnormal" in D21), the error output unit 105 outputs information (warning log) indicating that an abnormality is detected in the third area of the standby-side BIOS flash ROM 16.

The system down unit 104 checks whether or not the detection of an abnormality in the third area is the first-time detection (D22 in FIG. 11).

As a result of the check in D22, in a case where the detection of an abnormality in the third area is the first-time detection (YES in D22), the recovery unit 103 performs the recovery process for the BIOS (D23 in FIG. 11).

That is, the recovery unit 103 rewrites the data of the abnormality-occurred point in the standby-side BIOS flash ROM #1 by using the data read from the startup-side BIOS flash ROM #0.

After the recovery process is completed, the process returns to the D21. In this way, the diagnosis unit 101 diagnoses again the third area of the standby-side BIOS flash ROM #1 where the recovery process has been performed.

As a result of the check in D22, in a case where the detection of an abnormality in the third area is not the first-time detection (NO in D22), it is determined that an irrecoverable fault occurs in the third area.

Then, the error output unit 105 outputs a recovery failure log (warning), which indicates that the recovery process performed by the recovery unit 103 has failed, to a predetermined storage area of the NVRAM 13 (D24 in FIG. 11).

Thereafter, the process is terminated.

As a result of the diagnosis in D21, in a case where no abnormality is detected in the third area ("normal" in D21), the process is terminated.

In the CM 1 according to the embodiment, in a case where an abnormality is detected in one of the redundant BIOS flash ROMs 16, the recovery unit 103 restores the BIOS data by overwriting and updating the data in the abnormality-occurred point with the data read from the other BIOS flash ROM 16.

In this way, the BIOS flash ROM 16 in which an abnormality is detected may be self-restored in the CM 1, and it is possible to shorten the time for the recovery process and improve the system availability.

It becomes unnecessary to replace parts such as the BIOS flash ROM 16 and the CM 1, thereby reducing the cost for maintenance.

After recovery of the BIOS flash ROM 16 is performed by the recovery unit 103, the diagnosis unit 101 performs again diagnosis for the area in which an abnormality is detected. In this way, it is possible to improve the system reliability.

It is possible to minimize the time for the recovery process for the BIOS flash ROM 16 while maintaining the Reliability Availability Serviceability (RAS) function by performing diagnosis for and restoration of the BIOS flash ROM 16 during Power On Self Test (POST).

The present disclosure is not limited to the above-described embodiment, and various modifications may be made without departing from the spirit of the present disclosure.

For example, in the embodiment described above, an example in which the CM 1 is provided with two BIOS flash ROMs 16-1 and 16-2 for redundancy, but the present disclosure is not limited thereto and three or more BIOS flash ROMs 16 may be provided.

In the embodiment described above, the CPU 10 realizes the functions as the diagnosis unit 101, the EC information update unit 102, the recovery unit 103, the system down unit 104, and the error output unit 105 by executing the memory management program, but the present disclosure is not limited thereto. For example, a part of these functions may be realized by other processors or circuit devices, and various modifications may be made.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device, comprising:
a first memory configured to
store therein a first startup program for starting up the storage control device;
a second memory different from the first memory and the second memory configured to
store therein a second startup program for starting up the storage control device; and
a processor coupled to the first memory and the second memory;
a main memory coupled to the processor, the main memory being different from the first memory and the second memory, the processor being configured to:
perform a startup process of starting up the storage control device by executing the first startup program stored in the first memory;
perform diagnosis for the first memory during the startup process;
restore, in a case where an abnormality is detected in a first portion of a first area of the first memory, the first portion being less than the entire first area, first data stored in the first portion by overwriting the first data with data of a part of the second startup program stored in the second memory, the part of the second startup program being less than the entire second startup program, the first area being a storage area in which the first startup program is stored; and
restart the storage control device after switching an active startup program to be used in next startup of the storage control device in a case where data of a second part of the first startup program is stored in the first portion, the second part of the first startup program being executed in a period during which the main memory is unavailable and CAR is not yet enabled, the CAR being a function to make use of a cache of the processor as the main memory.

2. The storage control device according to claim 1, wherein
the processor is configured to:
restore the first data in a case where data of a first part of the first startup program is stored in the first portion, the first part of the first startup program being executed in a period during which the main memory is available.

3. The storage control device according to claim 2, wherein
the processor is configured to:
set the active startup program to be used in startup of the storage control device among the first startup program stored in the first memory and the second startup program stored in the second memory.

4. The storage control device according to claim 1, wherein the first data is overwritten at an address of a point where the abnormality occurred in the first portion.

5. A storage control method, comprising:

performing, by a computer, a startup process of starting up a storage control device by executing a first startup program stored in a first memory;

performing diagnosis for the first memory during the startup process;

restoring, in a case where an abnormality is detected in a first portion of a first area of the first memory, the first portion being less than the entire first area, first data stored in the first portion by overwriting the first data with data of a part of a second startup program stored in a second memory, the part of the second startup program being less than the entire second startup program, the first area being a storage area in which the first startup program is stored; and restart the storage control device after switching the active startup program to be used in next startup of the storage control device in a case where data of a second part of the first startup program is stored in the first portion, the second part of the first startup program being executed in a period during which the main memory is unavailable and CAR is not yet enabled, the CAR being a function to make use of a cache of the processor as the main memory.

6. The storage control method according to claim 5, further comprising:

restoring the first data in a case where data of a first part of the first startup program is stored in the first portion, the first part of the first startup program being executed in a period during which the main memory is available.

7. The storage control method according to claim 6, further comprising:

setting the active startup program to be used in startup of the storage control device among the first startup program stored in the first memory and the second startup program stored in the second memory.

8. The storage control method according to claim 5, wherein the first data is overwritten at an address of a point where the abnormality occurred in the first portion.

9. A non-transitory computer-readable recording medium having stored therein a program that causes a computer to execute a process, the process comprising:

performing a startup process of starting up a storage control device by executing a first startup program stored in a first memory;

performing diagnosis for the first memory during the startup process;

restoring, in a case where an abnormality is detected in a first portion of a first area of the first memory, the first portion being less than the entire first area, first data stored in the first portion by overwriting the first data with data of a part of a second startup program stored in a second memory, the part of the second startup program being less than the entire second startup program, the first area being a storage area in which the first startup program is stored; and restart the storage control device after switching the active startup program to be used in next startup of the storage control device in a case where data of a second part of the first startup program is stored in the first portion, the second part of the first startup program being executed in a period during which the main memory is unavailable and CAR is not yet enabled, the CAR being a function to make use of a cache of the processor as the main memory.

10. The non-transitory computer-readable recording medium according to claim 9, the process further comprising:

restoring the first data in a case where data of a first part of the first startup program is stored in the first portion, the first part of the first startup program being executed in a period during which the main memory is available.

11. The non-transitory computer-readable recording medium according to claim 10, the process further comprising:

setting an active startup program to be used in startup of the storage control device among the first startup program stored in the first memory and the second startup program stored in the second memory.

12. The non-transitory computer-readable recording medium according to claim 9, wherein the first data is overwritten at an address of a point where the abnormality occurred in the first portion.

* * * * *